US009173091B2

(12) United States Patent
Imbimbo et al.

(10) Patent No.: US 9,173,091 B2
(45) Date of Patent: Oct. 27, 2015

(54) LAWFUL INTERCEPTION OF UNAUTHORIZED SUBSCRIBERS AND EQUIPMENTS

(75) Inventors: Amedeo Imbimbo, Caivano (IT); Maurizio Iovieno, Mercato San Severino (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 2133 days.

(21) Appl. No.: 11/909,017

(22) PCT Filed: Mar. 18, 2005

(86) PCT No.: PCT/SE2005/000405
§ 371 (c)(1), (2), (4) Date: Sep. 18, 2007

(87) PCT Pub. No.: WO2006/098668
PCT Pub. Date: Sep. 21, 2006

(65) Prior Publication Data
US 2008/0216158 A1    Sep. 4, 2008

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04W 12/02* | (2009.01) |
| *H04M 3/20* | (2006.01) |
| *H04M 3/38* | (2006.01) |

(52) U.S. Cl.
CPC ............... *H04W 12/02* (2013.01); *H04L 63/00* (2013.01); *H04L 63/30* (2013.01); *H04M 3/20* (2013.01); *H04M 3/38* (2013.01); *H04M 2207/18* (2013.01)

(58) Field of Classification Search
None
See application file for complete search history.

(56) References Cited

U.S. PATENT DOCUMENTS

| | | | | |
|---|---|---|---|---|
| 5,822,413 | A | * | 10/1998 | Dunn et al. ............... 379/114.14 |
| 5,949,864 | A | * | 9/1999 | Cox .............................. 379/189 |
| 5,963,625 | A | * | 10/1999 | Kawecki et al. ......... 379/127.01 |
| 6,335,971 | B1 | * | 1/2002 | Springer et al. .............. 379/189 |

(Continued)

FOREIGN PATENT DOCUMENTS

| | | |
|---|---|---|
| EP | 1 098 489 A2 | 5/2001 |
| EP | 1 460 876 A2 | 9/2004 |

(Continued)

OTHER PUBLICATIONS

3GPP, 3rd Generation Partnership Project, Technical Specification Group Services and System Aspects, 3G security; Handover interface for Lawful Interception (Release 6), 3GPP TS 33.108 v6.8.2 (May 2005).

(Continued)

*Primary Examiner* — Nadia Khoshnoodi

(57) ABSTRACT

The present invention relates to methods and arrangements in a telecommunication system to override current access rights. The telecommunication system comprises an Access Point IAP; MSC, SGSN associated with a Configuration Unit ICU. The method comprises receiving to the Access Point IAP; MSC, SGSN from the Configuration Unit ICU, a request to monitor a system member MS, SIM. The method further comprises receiving to the Access Point from the Configuration Unit, a request to override deprived access rights for the system member MS, SIM. The method further comprises overriding in the Access Point IAP; MSC, SGSN, the deprived access rights for the member.

14 Claims, 6 Drawing Sheets

(56) References Cited

U.S. PATENT DOCUMENTS

| | | | |
|---|---|---|---|
| 6,381,631 | B1* | 4/2002 | van Hoff .................. 709/202 |
| 6,618,475 | B2* | 9/2003 | Marchand et al. ............ 379/145 |
| 6,754,834 | B2* | 6/2004 | Miettinen et al. ................. 726/3 |
| 6,914,468 | B2* | 7/2005 | Van Dijk et al. .............. 327/269 |
| 7,673,139 | B1* | 3/2010 | Satish et al. ................. 713/165 |
| 7,673,326 | B2* | 3/2010 | Shelest et al. ..................... 726/4 |
| 7,730,521 | B1* | 6/2010 | Thesayi et al. .................... 726/4 |
| 2002/0049913 | A1 | 4/2002 | Lumme et al. |
| 2002/0078384 | A1* | 6/2002 | Hippelainen ................ 713/201 |
| 2002/0172337 | A1* | 11/2002 | Marchand et al. ....... 379/114.14 |
| 2004/0063424 | A1* | 4/2004 | Silberstein et al. ........... 455/410 |
| 2004/0255126 | A1* | 12/2004 | Reith .......................... 713/183 |
| 2005/0010821 | A1* | 1/2005 | Cooper et al. ................ 713/201 |
| 2005/0094651 | A1* | 5/2005 | Lutz et al. .................... 370/401 |
| 2005/0175156 | A1* | 8/2005 | Afshar et al. .................. 379/35 |
| 2005/0188419 | A1* | 8/2005 | Dadhia et al. .................... 726/1 |
| 2006/0140200 | A1* | 6/2006 | Black et al. .................. 370/401 |

FOREIGN PATENT DOCUMENTS

| | | |
|---|---|---|
| WO | WO 01/93531 A2 | 12/2001 |
| WO | WO 2004/066603 A1 | 8/2004 |

OTHER PUBLICATIONS

3GPP, 3rd Generation Partnership Project; Technical Specification Group Services and System Aspects: 3G security; Lawful interception architecture and functions (Release 6) 3GPP TS 33.107 v6.4.0 (Dec. 2004).

3GPP TS 22.016 V3.0.1 (Oct. 1999); 3rd Generation Partnership Project; Technical Specification Group Services and System Aspects; International Mobile station Equipment Identities (IMEI) (3G TS 22.016 version 3.0.1).

3GPP TS 23.002 V6.0,1 (Mar. 2003) 3rd Generation Partnership Project; Technical Specification Group Services and Systems Aspects; Network architecture (Release 6).

3GPP TS 33.102 V6.0.0 (Sep. 2003) 3rd Generation Partnership Project; Technical Specification Group Services and System Aspects: 3G Security: Security architecture (Release 6).

3GPP TS 23.018 V6.0.0 (Jun. 2003) 3rd Generation Partnership Project; Technical Specification Group Core Network; Basic call handling; Technical realization (Release 6).

3GPP TS 23.060 V6.0.0 (Mar. 2003) 3rd Generation Partnership Project; Technical Specification Group Services and System Aspects; General Packet Radio Service (GPRS); Service description; Stage 2 (Release 6).

3GPP TS 29.002 V6.0.0 (Dec. 2002) 3rd Generation Partnership Project: Technical Specification Group Core Network; Mobile Application Part (MAP) specification; (Release 6).

3GPP TS 29.229 V6.0.0 (Mar. 2004) 3rd Generation Partnership Project; Technical Specification Group Core Network; Cx and Dx interfaces based on the Diameter protocol: Protocol details (Release 6).

TR45 TIA/EIA/IS-2001—A "Inter-Operability Specification (IOS) for CDMA 2000 Access Network Interfaces" Jun. 2001.

* cited by examiner

LAWFUL INTERCEPTION OF UNAUTHORIZED SUBSCRIBERS AND EQUIPMENTS

TECHNICAL FIELD OF THE INVENTION

The present invention relates to methods and arrangements in a telecommunication system to generate Interception Related Information related to unauthorized subscribers and equipment.

DESCRIPTION OF RELATED ART

Increasing amount of data traffic as well as real-time communication has lead to a demand for monitoring. One kind of monitoring is lawful interception, i.e. the act of intercepting a communication on behalf of a Law Enforcement Agency. Interception of Content of Communication i.e. speech and data is known. Interception of Intercept Related Information IRI is also known. Intercept Related Information is defined as signaling information related to target subscribers, for example call establishment. In Circuit Switching domain, the sending of IRI to a monitoring function is triggered by different call related and non-call related events. Appropriate session related and session unrelated events trigger the sending of IRI to a monitoring function in case of Packet Switching communication.

A prerequisite for the above types of monitoring is of course that Equipments and Subscribers are allowed to perform the above triggering events. Denied access rights for Equipments or Subscribers prevent this.

According to standards 3GPP TS 22.016 "International Mobile station Equipment Identities—IMEI", the IMEI can be used to take measures against the use of stolen equipment or against equipment of which the use in the PLMN cannot be tolerated for technical reasons. A network operator can make administrative use of the IMEI in the following manner: Three registers are defined, known as "white lists", "grey lists" and "black lists". The use of such lists is at the operators' discretion. The white list is composed of all number series of equipment identities that are permitted for use. The black list contains all equipment identities that belong to equipment that need to be barred. Besides the black and white list, administrations have the possibility to use a grey list. Equipments on the grey list are not barred (unless on the black list or not on the white list), but are tracked by the network (for evaluation or other purposes). The network shall terminate any access attempt or ongoing call when receiving any of the answers "black-listed" (i.e., on the black list) or "unknown" equipment (i.e., not on the white list) from the EIR. An indication of "illegal Equipment" shall in these cases be given to the user. The network architecture to perform the check of the IMEI is specified in 3GPP TS 23.002 "Network Architecture", rel 6. The so called F-interface and Gf-interface are used respectively by the Mobile Services switching Center MSC and by the Serving GPRS Support Node SGSN to exchange data with the Equipment Identity Register EIR, in order to allow the EIR to verify the status of the IMEI retrieved from the Mobile Station.

One of the security features, described in 3GPP TS 33.102 "Security architecture", rel-6 relates to user authentication: the property that the serving network corroborates the user identity of the user. The user authentication occurs at each connection set-up between the user and the network. As stated in 3GPP TS 23.018 "Basic call handling", rel-6, for the basic call, the user authentication may occur at any stage during the establishment of an mobile originating call and on location registration or, if the user authentication is not executed on the location registration, the network may initiate authentication after the Mobile Subscriber responds to paging. As stated in 3GPP TS 23.060 "General Packet Radio Service GPRS", rel-6, the user authentication function is performed in association with the Mobility Management functions. The MAP operations used in the signaling procedure for the user authentication, are described in 3GPP TS 29.002 "Mobile Application Part (MAP) Specification", rel-6. In the Internet Protocol Multimedia Subsystem IMS network architecture, the Diameter application for Cx interface is used for the authentication of a user when accessing the IMS, 3GPP TS 29.229 "Cx and Dx interfaces based on the diameter protocol", rel-6. In the Packed Data CDMA network, the Diameter protocol is used for the authentication in the PDSN node, according to the procedures specified in TR45 TIA/EIA/IS-2001-A "Inter-Operability Specification (IOS) for CDMA 2000 Access Network Interfaces", June 2001".

According to current Lawful Interception standards, it is not possible to monitor Equipments or Subscribers of which access rights have been deprived. This as a natural consequence since the network terminates any access attempt or ongoing call for Equipments or Subscribers not allowed to access/use the network. From Lawful Interception perspective there is a demand for monitoring of IRI and Content of Communication involving also unauthorized Subscribers and Equipments.

According to current lawful Interception standards, it is furthermore not possible to inform a Lawful Interception Agency LEA during current interception of a defined target (i.e. Equipment), about a change of classification of the Equipment. The LEA will only be informed by means of Intercepted Related Information IRI when the Equipment is trying to access the network and the network denies the access attempt. Having the information that Equipment has been blacklisted or grey listed allows the LEA to know in advance that there will be no further interception on the given target, and proper actions can be taken.

SUMMARY OF THE INVENTION

The present invention relates to a problem how to monitor a member (i.e. equipments or subscribers) of a telecommunication system, for which access rights have been deprived.

This problem is solved by the invention by overriding deprived access rights of the member and thereby permitting the member to temporarily access the system.

The solution to the problem more in detail is a method and arrangement to override current access rights for a system member. The system comprises an Access Point that is associated with a Configuration Unit. The method comprises the following steps:

Receiving to the Access Point from the Configuration Unit, a request to override deprived access rights for the defined member.

Verifying in the Access Point that access rights for the member are deprived.

Overriding in the Accept Point, the deprived access rights for the member.

An object of the invention is to allow calls for unauthorized members and by that be able to intercept also these members.

The present invention also relates to a further problem how to inform a Lawful Interception Agency during on-going interception of a target, about a change of classification of the monitored target.

This problem is solved by the invention by, as soon as possible after a change of a classification activity, communicating the change from the access point to the Law Enforcement Agency.

The solution to the further problem more in detail is a method and arrangement in a telecommunication system that comprises an Access Point that is associated with a Configuration Unit. The method comprises the following steps:

Receiving to the Access Point from the Configuration Unit, a request to monitor a target.

Registration in the Access Point of a change of classification activity for the monitored target.

Delivering information related to the change of classification activity, from the Access Point to the Configuration Unit.

A further object of the invention is to inform the Law enforcement Agencies during on-going interception that there will be no further interception on the given target, whereby proper actions can be taken.

Advantages with the invention are that Operators can provide a more powerful monitoring of telecommunication services and applies to any nodes in any network scenarios where the equipment check and the user authentication is performed. Other advantages of the invention are that the invention will give the agency a powerful mean to intercept user conversations, physical positions, and data transmissions foreseen by the Lawful interception standards even when the user uses an illegal (e.g. stolen) equipment or illegal identities (e.g. cloned SIM/USIM), without making the target subscriber aware of being monitored. The benefit can be identified in relation to telecommunication fraud related crimes, but also in relation to other crimes persecuted or investigated onto users that most probably also try to use illegally telecommunication services.

The invention will now be described more in detail with the aid of preferred embodiments in connection with the enclosed drawings.

DETAILED DESCRIPTION OF EMBODIMENTS

Figure 1:
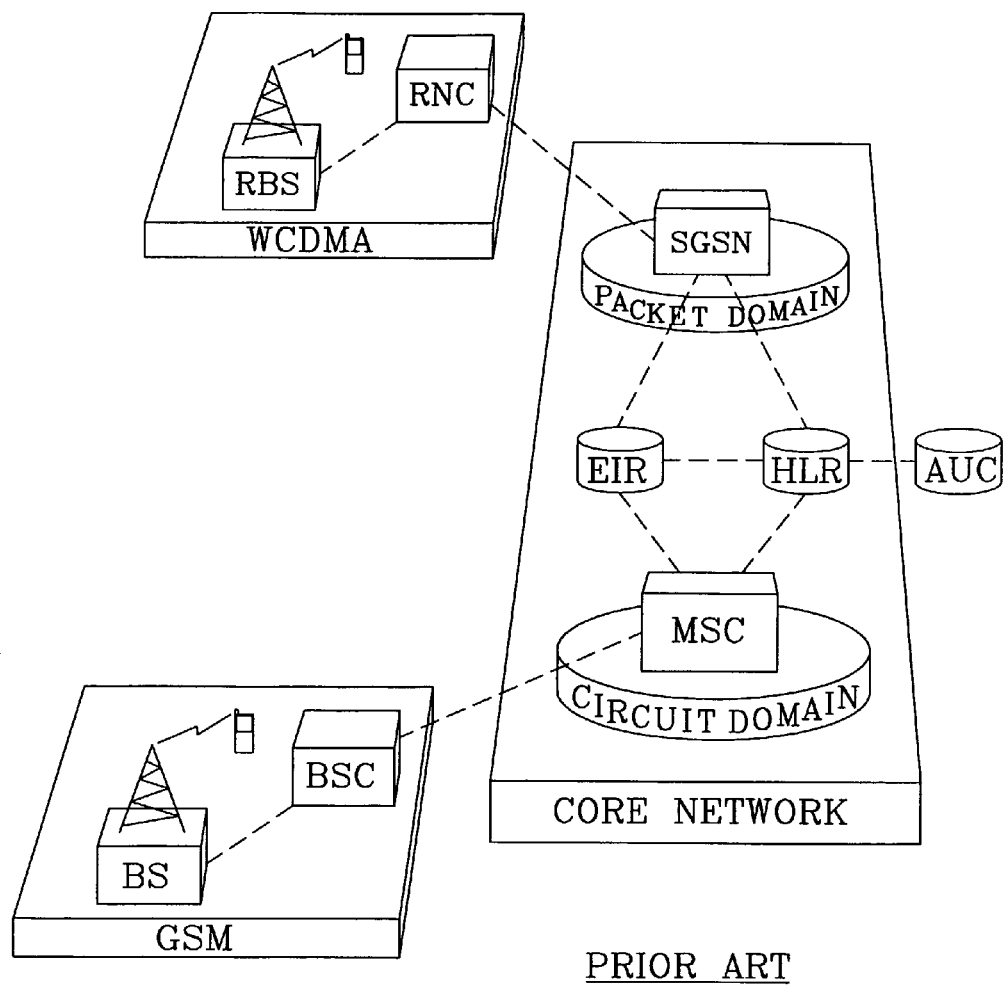
FIG. 1 discloses in a three-dimensional view a block schematic illustration of a prior art communication system that communicates in packet and circuit domains.

FIG. 1 discloses a block diagram of a prior art wireless communication system. The system comprises radio network subsystems such as a Radio Network Controller RNC in a WCDMA system and a Base Station Controller BSC in a GSM system. The radio network subsystems are in communication with a CORE NETWORK. The WCDMA system is connected to a Serving GPRS Support Node SGSN in PACKET DOMAIN in the core network. The GSM system is connected to a Mobile Services Switching Center MSC in CIRCUIT DOMAIN in the core network. An Equipment Identity Register EIR in the core network is connected to the SGSN and to the MSC. The EIR comprises Different lists and the network shall terminate any access attempt or ongoing call when receiving any of the answers "black-listed" (i.e. equipments is on the black list) or "unknown" (i.e. equipments is not on the white list) from the Equipment Identity Register EIR. An Authentication Center AUC is via a Home Location Register HLR connected to the SGSN and to the MSC. The authentication property confirms the user identity of the user. User authentication occurs at each connection set-up between the user and the network.

Figure 2:
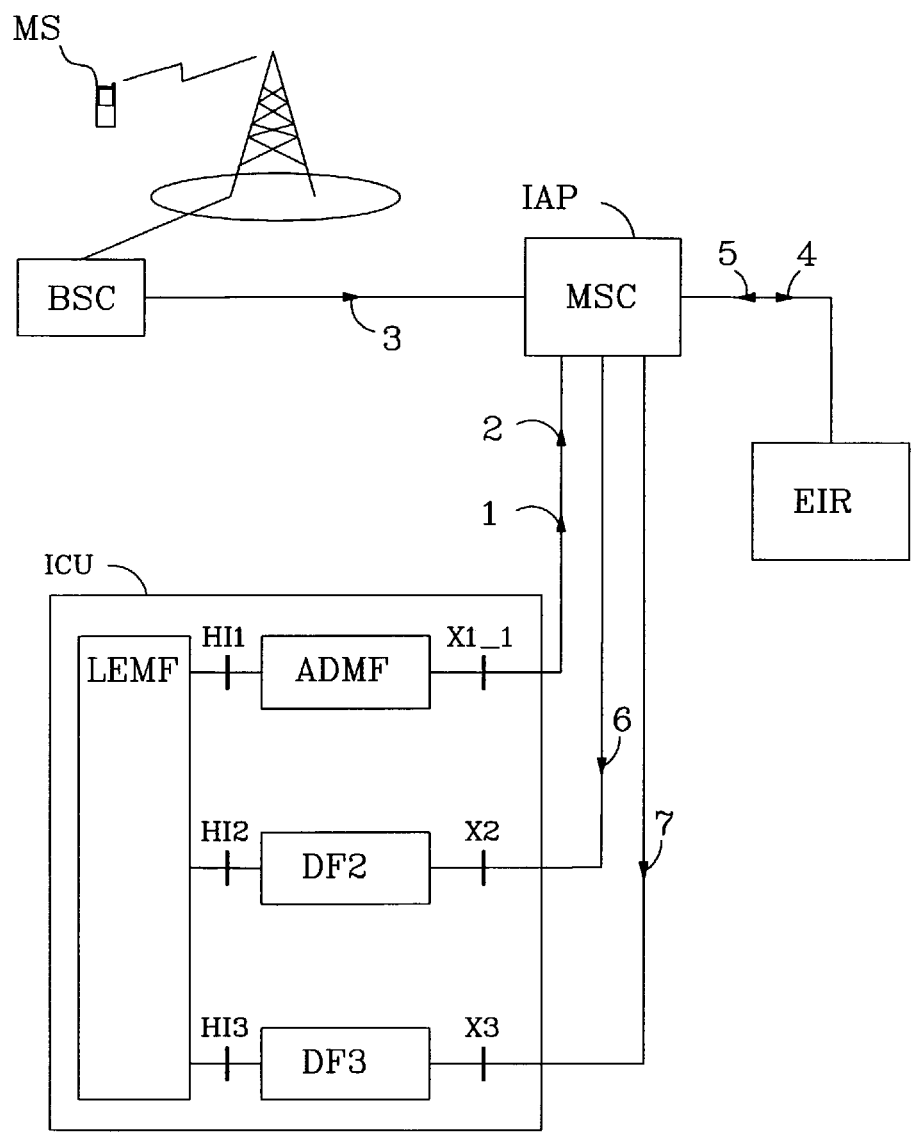
FIG. 2 discloses a block schematic illustration of the invention when used to override Equipment classification results in a circuit domain based system.

Two embodiments of the invention will now be explained more in detail together with FIGS. 2 and 3. The two figures are parts the FIG. 1 discussed above, and relates to overriding of deprived access rights for telecommunication system members. FIG. 2 relates to overriding of access rights for equipments in a circuit domain based system and FIG. 3 relates to overriding of access rights for users in a packet domain based system. To be noted is that both embodiments are applicable in both circuit and packet domain based systems.

FIG. 2 discloses a first embodiment of the invention. An Intercept Configuration Unit ICU is disclosed in FIG. 2. The different parts of the ICU belong to prior art and are disclosed in current Lawful Interception standards (see 3GPP TS 33.108 and 3GPP TS 33.107—Release 6). The ICU comprises a Law Enforcement Monitoring Function LEMF. The LEMF is connected to three Mediation Functions respectively for ADMF, DF2, DF3 i.e. an Administration Function ADMF and two Delivery Functions DF2 and DF3. The Administration Function and the Delivery Functions are each one connected to the LEMF via standardized interfaces H1-H3, and connected to the telecommunication network via the interfaces X1-X3. The ADMF is connected via the interfaces HI1/X1_1 while DF2 is connected via HI2/X2 and DF3 is connected via HI3/X3. The messages sent from LEMF to ADMF via HI1 and from the ADMF to the network via the X1_1 interface comprise identities of the subscriber/equipment that is to be monitored, i.e. target identities. The Delivery Function DF2 receives Intercept Related Information IRI from the network via the X2 interface and DF2 is used to distribute the IRI to relevant Law Enforcement Agencies via the HI2 interface. The Delivery Function DF3 receives Content of Communication CC, i.e. speech and data. DF3 is responsible for call control signaling and bearer transport for an intercepted product. Intercept Related Information IRI, received by DF2 is triggered by Events that in Circuit Switching domain are either call related or non-call related.

In this first embodiment the Administration Function ADMF is connected via the X1_1 interface to a Mobile Services Switching Center MSC, i.e. to the so-called Intercept Access point IAP (or Intercepting Control Element ICE when 3GPP terminology is used). The Delivery Function DF2 is connected to the MSC via the X2 interface and the DF3 is connected to the MSC via the X3 interface. A Mobile Subscriber MS is associated to the MSC via a Base Station Controller BSC. An Equipment Identity Register EIR is connected to the MSC.

A method according to the first embodiment of the invention will now be explained more in detail. The explanation is to be read together with FIG. 2. The method comprises the following steps:

The Law Enforcement Monitoring Function LEMF sends via the HI1 interface, a request 1 to the Administration Function ADMF to activate interception of a target MS. The International Mobile Equipment Identity IMEI, the International Mobile Subscriber Identity IMSI or the Mobile Station International ISDN Number identifies the target.

The Law Enforcement Monitoring Function LEMF sends via HI1 an override request 2 to the ADMF, i.e. a command to override the IMEI classification if access rights are deprived. The request 1 and the command 2 may be sent separately or together as parameters in the same message.

The ADMF forwards the requests 1 and 2 via the interface X1_1 to the Mobile Services Switching Center MSC. The received information is stored in the MSC.

A call set-up request message 3 is sent from the target MS to the MSC. The International Mobile Equipment Identity IMEI, the International Mobile Subscriber Identity IMSI or the Mobile Station International ISDN Number identifies the MS.

The MSC sends a check classification request 4 regarding the MS to the Equipment Identity Register EIR.

The EIR replies to the request 4 by sending information 5 to the MSC that the access rights for the MS in this example have been deprived.

The MSC stores the negative result coming from the EIR, as in existing technology.

The MSC verifies that the MS is identified as an intercepted target.

The override command 2 is identified in the MSC and the MSC overrides the negative result from the Equipment Identity Register EIR, i.e. since the override option was set for the intercepted target, the MSC continues establishing the call in spite of the negative result.

The MSC forwards Intercept Related Information IRI and Content of Communication CC—6 and 7 to the Law Enforcement Monitoring Function LEMF via the delivery function DF2 and DF3 respectively. An indication of the overridden IMEI check result is also sent as part of the IRI via the DF2.

To summarize: When LEMF orders an interception of a certain target to ADMF, optionally the "check IMEI override" option can be set. This option is included in the X1 interface towards the MSC or the SGSN (FIG. 3) when activating the interception. When a user requests a call establishment to the MSC (or a packet data session establishment request to the SGSN), the MSC (or the SGSN) starts IMEI check procedure towards the EIR. If the procedure returns a negative result, when a user is under interception and the new option is set, the MSC (or the SGSN) continues establishing the call (or the packet data session), in spite of the negative result of the IMEI check procedure. So the MSC (or the SGSN) can send IRI and Content of Communication to the DF2 and DF3 respectively. The first IRI sent to the agency shall send an indication on the failed IMEI check procedure, overridden for interception purposes.

Mechanisms in the nodes (such as MSC, SGSN) shall be implemented to avoid that a subscriber using a terminal with blacklisted IMEI becomes aware of being intercepted due to a sudden possibility to access the network. As example, a possible solution to avoid the risk indicated above is that the involved node shall mark that the network due to blacklisting rejects a communication attempt. In this case, if a "check IMEI override" is received on LI activation, the node should ignore this setting. The problem in other words is that the end-user shall not be aware that it is under monitoring. Another example, a user is not under interception, but his terminal is blacklisted. He makes a call, but it is rejected. Then an agency wants to activate the interception with the override option. Upon a second call (now successfully accepted by the node), the end-user could perceive that it is under monitoring. So, in this case it is not advisable that the override option is accepted. The order from ADMF to the IAP (or ICE) with the override option is rejected.

Figure 3:
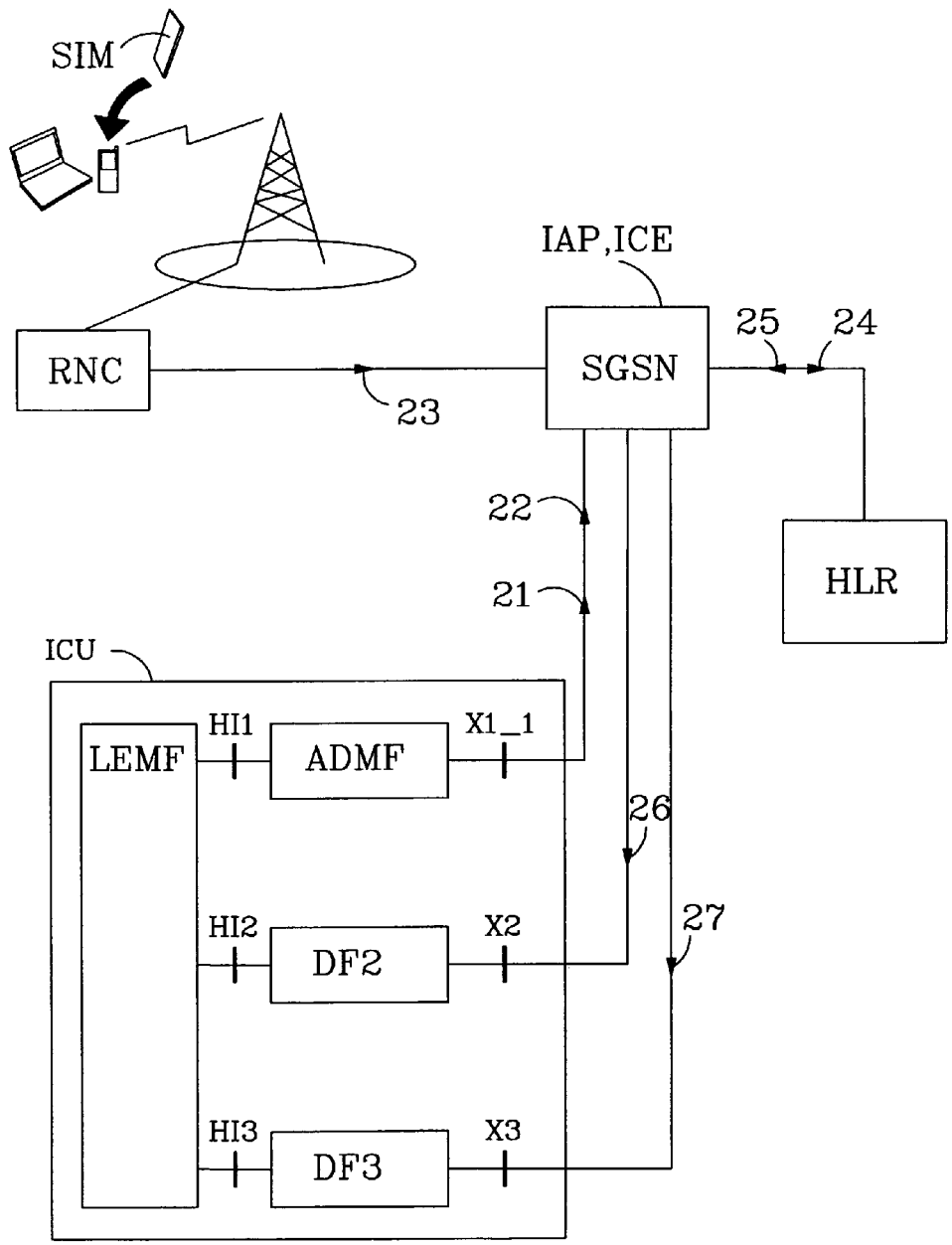
FIG. 3 discloses a block schematic illustration of the invention when used to override authentication procedure results in a packet domain based system.

FIG. 3 discloses a second embodiment of the invention. The same ICU already disclosed in FIG. 2 is disclosed in FIG. 3. To be noted is that the system in the second embodiment is of type Packet Switching Communication and that appropriate session related and session unrelated events trigger the sending of IRI to the LEMF.

In this second embodiment the Administration Function ADMF is connected to a Serving GPRS Support Node SGSN via the X1_1 interface. The Delivery Function DF2 is connected to the SGSN via the X2 interface and the DF3 is connected to the SGSN via the X3 interface. A user of the Mobile Station MS is in possession of a Subscriber Identity Module SIM that is inserted in the MS. The MS is associated to the SGSN via a Radio Network Controller RNC. A Home Location Register HLR is connected to the SGSN.

A method according to the second embodiment of the invention will now be explained more in detail. The explanation is to be read together with FIG. 3. The method comprises the following steps:

The Law Enforcement Monitoring Function LEMF sends via the HI1 interface, a request 21 to the Administration Function ADMF to activate interception of a target SIM. The Subscriber Identity Module SIM identifies one or more identities associated to the SIM.

The Law Enforcement Monitoring Function LEMF sends via HI1 an authentication check override request 22 to the ADMF, i.e. a request to override the authentication check for the target if access rights are deprived.

The ADMF forwards 21 and 22 via the interface X1_1 to the Serving GPRS Support Node SGSN. The received information is stored in the SGSN.

A request GPRS packet data establishment message 23 is sent from the user who is in possession of the SIM, to the SGSN. An International Mobile Subscriber Identity IMSI identifies the SIM.

The SGSN starts an authentication procedure towards the Authentication center, i.e. towards the Home Location Register HLR, by sending an authentication check request 24.

The HLR replies to the request 24 by sending information 25 to the SGSN that the access rights for the SIM have been deprived.

The SGSN stores the negative result coming from the HLR, as in existing technology.

The SGSN verifies that the SIM is identified as an intercepted target.

The override command 22 is identified in the SGSN and the SGSN overrides the negative result from the Home Location Register HLR, i.e. since the override option was set for the intercepted target, the SGSN continues establishing the session in spite of the negative result.

The SGSN forwards Intercept Related Information IRI and Content of Communication CC—26 and 27 to the Law Enforcement Monitoring Function LEMF via the delivery function DF2 and DF3 respectively. An indication of the overridden authentication check result is also sent as part of the IRI via the DF2.

To summarize: When LEMF orders an interception of a certain target to ADMF, optionally the "authentication check override" option can be set. This option is included in the X1 interface towards any IAP (or ICE), which foresees an authentication procedure before providing any telecommunication service, when activating the interception. When a user requests a telecommunication service (e.g. a call establishment to the MSC or a packet data session establishment request to the SGSN), the IAP (e.g. the MSC or the SGSN) starts an authentication procedure towards an authentication center (e.g. HLR). If the procedure returns a negative result, when a user is under interception and the new option is set, the IAP continues establishing the telecommunication service (e.g. the call or the packet data session), in spite of the negative result of the authentication check procedure. So the IAP (e.g. MSC or the SGSN) can send IRI and Content of Communication to the DF2 and DF3 respectively. The first IRI sent to the agency shall send an indication on the failed authentication check procedure, overridden for interception purposes.

In this embodiment, all nodes belonging to Telecommunication Service Providers, which can order authentication and provide the service or not can act as an Interception Access point IAP (or ICE) i.e. the node to which the ICU is connected and from which IRI is collected. MSC, SGSN, CSCF and PDSN nodes are individuated among the IAPs currently foreseen in the 3GPP and J-STD-025B lawful intercept standards. The invention applies to all target types foreseen by the standards.

Mechanisms in the nodes (such as MSC, SGSN) shall be implemented to avoid that a subscriber whose access was not authorized due to authentication failure becomes aware of being intercepted due to a sudden possibility to access the network. As example, a possible solution to avoid the risk indicated above is that the involved node shall mark that the network due to authentication failure rejects a communication attempt. In this case, if an "authentication check override" is received on LI activation, the node should ignore this setting.

Figure 4:
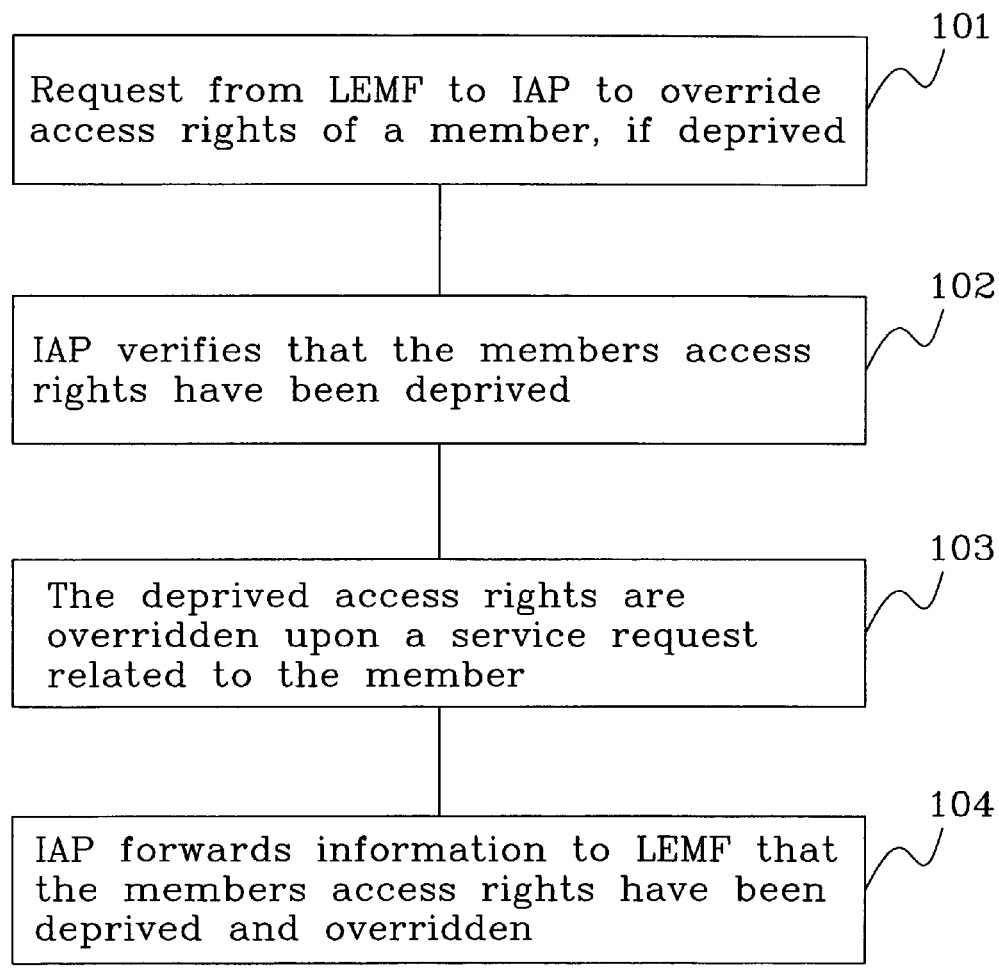
FIG. 4 discloses a flow chart illustrating some essential method steps of the invention.

FIG. 4 discloses a flowchart in which some of the more important steps of the above two methods are shown. The flowchart is to be read together with the earlier shown figures. The flowchart comprises the following steps:

The Law Enforcement Monitoring Function LEMF sends a request 2, 22 to the Intercept Access Point MSC, SGSN to check the member MS, SIM. If access rights are deprived, then override the deprived rights. The received information is stored in the Access Point. This step is disclosed in FIG. 4 by a block 101.

The Access Point MSC, SGSN sends a check request 4, 24 regarding the member's access rights to the register EIR, HLR that contains the wanted information. The register EIR, HLR replies to the request 4, 24 by sending information 5, 25 to the access point MSC, SGSN that the access rights for the member have been deprived. This step is disclosed in FIG. 4 by a block 102.

The override request 2, 22 is identified in the access node MSC, SGSN and the negative result from the register EIR, HLR will be overridden upon a service request. This step is disclosed in FIG. 4 by a block 103.

The access point MSC, SGSN forwards Intercept Related Information IRI to the Law Enforcement Monitoring Function LEMF via the delivery function DF2. An indication of the overridden check result is also sent as part of the IRI via the DF2. This step is disclosed in FIG. 4 by a block 104.

A third embodiment of the invention will now be discussed. According to current lawful Interception standards, it is not possible to inform a Law Enforcement Monitoring Function LEMF during current interception of a defined target (i.e. Equipment), about a change of classification of the Equipment. The LEMF will only be informed by means of Intercepted Related Information IRI when the Equipment is trying to access the network and the network denies the access attempt. Having the information that Equipment has been blacklisted or grey listed allows the LEA to know in advance that there will be no further interception on the given target, and proper actions can be taken.

Figure 5:
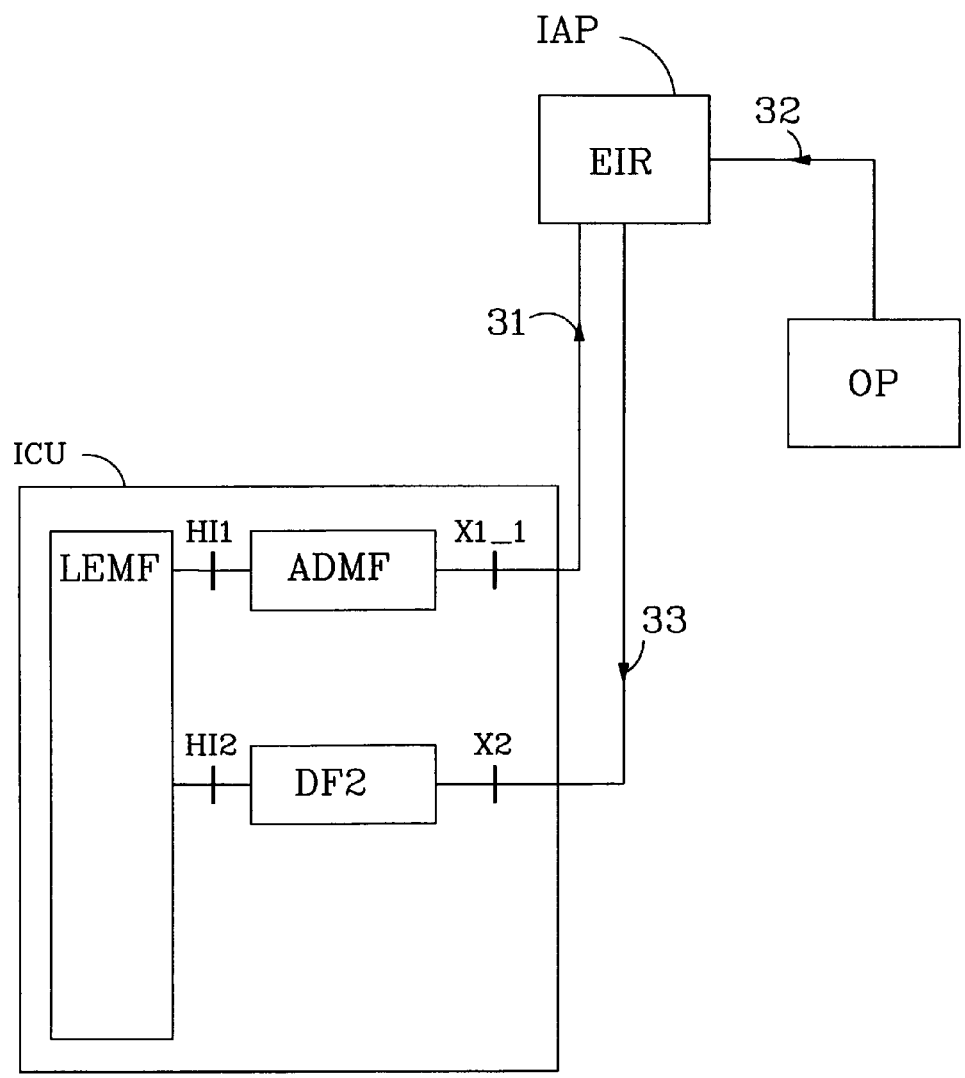
FIG. 5 discloses a block schematic illustration of the invention when used to inform an agency of a change of classification.

FIG. 5 discloses the third embodiment of the invention. In this third embodiment, the Administration Function ADMF is connected to the Equipment Identity register EIR via the X1_1 interface. The Delivery Function DF2 is connected to the EIR via the X2 interface. An operator OP is associated to the EIR.

A method according to the third embodiment of the invention will now be explained more in detail. The explanation is to be read together with FIG. 5. The method comprises the following steps:

The Law Enforcement Monitoring Function LEMF sends via the HI1 interface, an order 31 to the Administration Function ADMF to activate interception of a defined equipment with International Mobile station Equipment Identity IMEI.

The ADMF forwards the order 31 via the interface X1_1 to the Equipment Identity Register EIR. The EIR will mark the given IMEI as a target under interception.

A change of the IMEI classification 32 is sent from the Operator OP to the EIR.

The EIR verifies that the IMEI is identified as an intercepted target.

Figure 6:
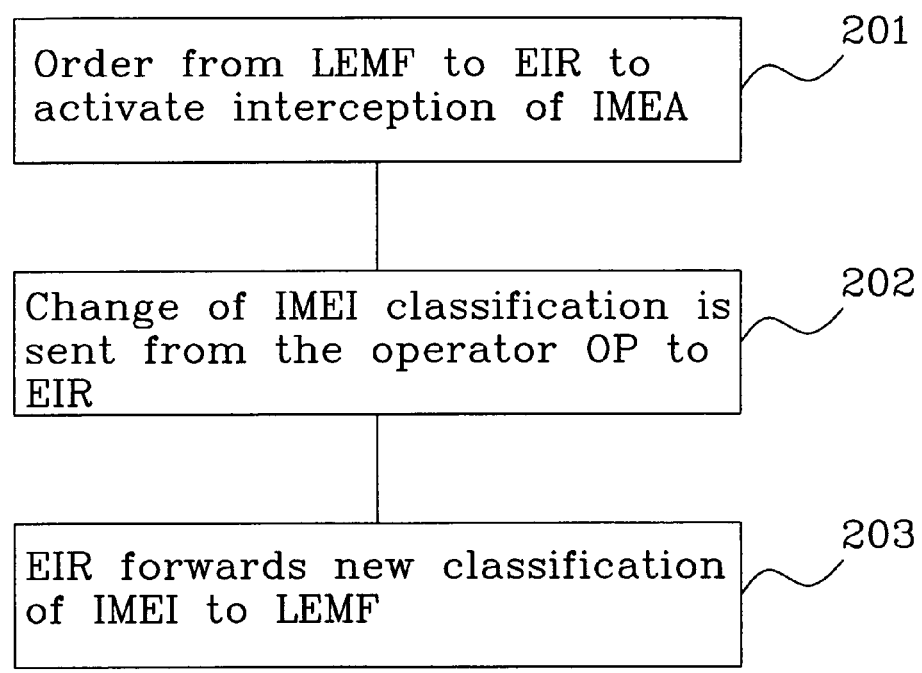
FIG. 6 discloses a flow chart illustrating some essential method steps of the invention.

The EIR forwards Intercept Related Information IRI to the Law Enforcement Monitoring Function LEMF via the delivery function DF2. The new message sent by the EIR to the DF2 will carry among all the following parameters:

IMEI
Observed IMSI (if known in the EIR)
Old classification in the EIR
New classification in the EIR The information will then be passed over HI2 to LEMF by using a new IRI-report record FIG. 6 discloses a flowchart in which some of the more important steps of the above method related to the third embodiment is shown. The flowchart is to be read together with the earlier shown figures. The flowchart comprises the following steps:

The Law Enforcement Monitoring Function LEMF sends an order 31 to the Equipment Identity Register EIR to activate interception of a defined International Mobile station Equipment Identity IMEI. The EIR will mark the given IMEI as a target under interception. This step is disclosed in FIG. 6 with a block 201.

A change of the IMEI classification 32 is sent from the Operator OP to the EIR. This step is disclosed in FIG. 6 with a block 202.

The EIR forwards the new classification in the EIR to the Law Enforcement Monitoring Function LEMF via the delivery function DF2. This step is disclosed in FIG. 6 with a block 203.

Different variations are possible within the scope of the invention. For example, the idea to have an immediate signaling to LEMF from the EIR would of course apply to any network entity handling the IMEI check feature. The internal order between the different steps in the above methods may vary. For example may access rights be checked either after a service request from the target, or independently of potential arrival of service request. The invention is related to IMEI check features within the wireless networks, and authentication procedure to CS, PS and IMS domains for GSM, WCDMA and CDMA access types. IP Multimedia Subsystem IMS is access agnostic, hence it is not just for UMTS or GPRS, but will also support WLAN, fixed line, etc. In the packet data CDMA network, the Diameter protocol is used for the authentication in the PSDN node. Also in the case of temporary call barred users, the invention is applicable. There are cases when the network blocks users (e.g. when the user has not paid the bill) and the call establishment requests are not accepted. Also in this case an override option could be proposed. This can be applied e.g. to the Wire-line Local Exchange where the user can be assigned to a temporary call barring category or to the MSC which gets the indication that the call is barred for operator reasons from the MSC in the MAP protocol.

The invention is in other words not limited to the above described and in the drawings shown embodiments but can be modified within the scope of the enclosed claims.

The invention claimed is:

1. A method in a telecommunication system to monitor unauthorized system members, the system members comprising one or more of user equipments and mobile subscribers, the telecommunication system comprising an Access Point associated with a Law Enforcement Monitoring Function, the method comprising the following steps:
   receiving to the Access Point from the Law Enforcement Monitoring Function, a request to monitor a system member for which access rights to the telecommunication system have been deprived,
   wherein the Law Enforcement Monitoring Function can only monitor system members when they access the telecommunication system;
   receiving to the Access Point from the Law Enforcement Monitoring Function, a request to override deprived access rights for the system member; and
   overriding in the Access Point, the deprived access rights for the system member, allowing the system member to temporarily access the telecommunication system, thereby enabling lawful interception of the system member;
   prior to overriding the deprived access rights, receiving a first service request message from the system member at the Access Point;
   rejecting the first service request.

2. The method of claim 1 comprising the following further step:
   sending from the Access Point to the Law Enforcement Monitoring Function, an indication of the system member's overridden access right.

3. The method of claim 1 comprising the following further steps:
   sending a service request message from the system member to the Access Point;
   establishing the requested service in the system.

4. The method of claim 3 comprising the following further step:
   delivering Intercept Related Information related to the system member, from the Access point to the Law Enforcement Monitoring Function.

5. The method of claim 1 comprising the following further steps:
   verifying in the Access Point that access rights for the system member are deprived.

6. The method of claim 1 comprising the following further steps:
   sending a check request regarding the system member's access rights, from the Access Point to the register that contains the wanted information;
   replying to the request by sending information from the register to the Access Point that the access rights for the system member have been deprived.

7. The method of claim 1 comprising the following further steps:
   subsequent to overriding the deprived access rights, receiving a second service request message from the member at the Access Point; and
   rejecting the second service request.

8. An arrangement in a telecommunication system to monitor unauthorized system members, the system members comprising one or more of user equipments and mobile subscribers, the telecommunication system comprising an Access Point associated with a Law Enforcement Monitoring Function, the arrangement comprising:
   means for receiving to the Access Point from the Law Enforcement Monitoring Function, a request to monitor a system member for which access rights to the telecommunication system have been deprived,
   wherein the Law Enforcement Monitoring Function can only monitor system members when they access the telecommunication system;
   means for receiving to the Access Point from the Law Enforcement Monitoring Function, a request to override deprived access rights for the system member; and
   means for overriding in the Access Point, the deprived access rights for the system member, allowing the system member to temporarily access the telecommunication system, thereby enabling lawful interception of the system member;
   means for, prior to overriding the deprived access rights, receiving a first service request message from the system member at the Access Point;
   means for rejecting the first service request.

9. The arrangement of claim 8 comprising:
   means for sending from the Access Point to the Law Enforcement Monitoring Function, an indication of the system member's overridden access right.

10. The arrangement of claim 8, comprising:
    means for sending a service request message from the system member to the Access Point;
    means for establishing the requested service in the system.

11. The arrangement of claim 10 comprising:
    means for delivering Intercept Related Information related to the system member, from the Access point to the Law Enforcement Monitoring Function.

12. The arrangement of claim 8 comprising:
    means for verifying in the Access Point that access rights for the system member are deprived.

13. The arrangement of claim 12 comprising:
    means for sending a check request regarding the system member's access rights, from the Access Point to the register that contains the wanted information;
    means for replying to the request by sending information from the register to the Access Point that the access rights for the system member have been deprived.

14. The arrangement of claim 8 comprising:
    means for receiving a second service request message from the system member at the Access Point, after overriding in the Access Point, the deprived access rights;
    means for rejecting the second service request.

* * * * *